US012236466B2

(12) United States Patent
Christensen et al.

(10) Patent No.: US 12,236,466 B2
(45) Date of Patent: Feb. 25, 2025

(54) SIZE COMPARISON METHODS INCLUDING ONLINE COMMERCE EXAMPLES UTILIZING SAME

(71) Applicant: MICRON TECHNOLOGY, INC., Boise, ID (US)

(72) Inventors: Carla L. Christensen, Boise, ID (US); Bethany M. Grentz, Boise, ID (US); Xiao Li, Boise, ID (US); Sumana Adusumilli, Boise, ID (US); Libo Wang, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 23 days.

(21) Appl. No.: 17/176,952

(22) Filed: Feb. 16, 2021

(65) Prior Publication Data
US 2022/0261871 A1    Aug. 18, 2022

(51) Int. Cl.
*G06Q 30/0601* (2023.01)
*G06T 19/00* (2011.01)

(52) U.S. Cl.
CPC ..... *G06Q 30/0629* (2013.01); *G06Q 30/0643* (2013.01); *G06T 19/006* (2013.01)

(58) Field of Classification Search
CPC .......... G06Q 30/0629; G06Q 30/0643; G06Q 30/0601–0643; G06Q 30/0621; G06Q 30/0623–0629; G06Q 30/0641–0643; G06Q 30/06–0643; G06T 19/006
See application file for complete search history.

(56) References Cited

U.S. PATENT DOCUMENTS

| | | | |
|---|---|---|---|
| 9,129,404 B1* | 9/2015 | Wagner | G06T 7/60 |
| 11,126,845 B1* | 9/2021 | Chaturvedi | G06F 3/011 |
| 2015/0084951 A1* | 3/2015 | Boivin | H04N 5/272 |
| | | | 345/419 |
| 2016/0253746 A1* | 9/2016 | Morrison | G06Q 30/0625 |
| | | | 705/26.62 |
| 2016/0364779 A1* | 12/2016 | Kim | G06F 16/5854 |
| 2019/0220918 A1* | 7/2019 | Koenig | G06T 11/60 |
| 2020/0117336 A1* | 4/2020 | Mani | F25B 49/005 |
| 2020/0302501 A1* | 9/2020 | Joseph | G06F 3/011 |
| 2021/0166028 A1* | 6/2021 | Ramenahalli Govindaraju | |
| | | | G06V 20/52 |
| 2021/0192340 A1* | 6/2021 | Stonehouse | G06Q 30/0185 |
| 2021/0201461 A1* | 7/2021 | Parikh | G06T 7/0002 |
| 2021/0357107 A1* | 11/2021 | Singhal | G06V 10/267 |
| 2022/0130114 A1* | 4/2022 | Handa | G06T 19/006 |

OTHER PUBLICATIONS

Charlton, Alistair. "These AR apps help you virtually place a new TV at home before buying" GearBrain.com (Year: 2020).*

(Continued)

*Primary Examiner* — Kelly S. Campen
*Assistant Examiner* — Katherine A Barlow
(74) *Attorney, Agent, or Firm* — Dorsey & Whitney LLP

(57) ABSTRACT

A size comparison system may generate a size comparison by determining a size of an item based on extracted size data corresponding to the item. A comparison item is selected and the size comparison is generated between the item and the comparison item based on the size of the item. A visual rendering of the item and the comparison item is generated based on the size comparison and is displayed to a user.

16 Claims, 5 Drawing Sheets

(56) References Cited

OTHER PUBLICATIONS

Friedman, Alan. "Apple and Ikea to launch an AR furniture app this fall" PhoneArena.com (Year: 2017).*

Shankland, Stephen. "IBM app marries augmented reality, comparison shopping" CNET.com (Year: 2013).*

Pontil, M. et. al. "Support vector machines for 3D object recognition," in IEEE Transactions on Pattern Analysis and Machine Intelligence, vol. 20, No. 6, pp. 637-646, June, doi: 10.1109/34.683777. (Year: 1998).*

Fan, Haoqiang, et. al. "A Point Set Generation Network for 3D Object Reconstruction From a Single Image" Proceedings of the IEEE Conference on Computer Vision and Pattern Recognition (CVPR), pp. 605-613 (Year: 2017).*

Tang Y, et. al. "Comprehending products with mixed reality: Geometric relationships and creativity." International Journal of Engineering Business Management. vol. 10. doi:10.1177/1847979018809599 (Year: 2018).*

Ahn, J., et. al. Size Perception of Augmented Objects by Different AR Displays. HCI International 2019—Posters. HCII 2019. Communications in Computer and Information Science, vol. 1033, pp. 337-344. (Year: 2019).*

Alldieck, T., et. al. "Video Based Reconstruction of 3D People Models". Proceedings of the IEEE Conference on Computer Vision and Pattern Recognition (CVPR). pp. 8387-8397. (Year: 2018).*

* cited by examiner

SIZE COMPARISON METHODS INCLUDING ONLINE COMMERCE EXAMPLES UTILIZING SAME

TECHNICAL FIELD

Examples described herein relate generally to systems and methods which may facilitate size comparison of items. Examples of online commerce applications utilizing a size comparison system may generate a visual rendering of an item and a comparison item to facilitate size comparison of items for sale through online commerce.

BACKGROUND

Shopping through online commerce platforms has become more prevalent as users have increased access to the internet and comfort with online shopping. When online shopping, users may have difficulty visualizing the physical size of items for sale, which may lead to user frustration, increased returns, and, in some cases, negative reviews of sellers even when sellers provide users with dimensions of an item in the item's listing.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
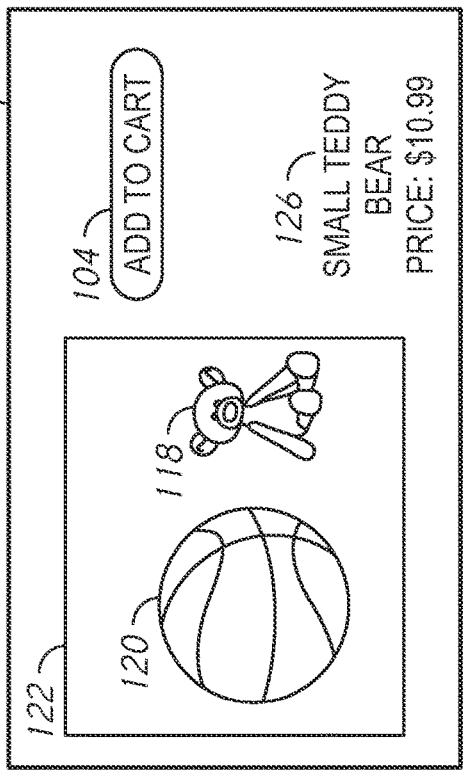
FIG. 1 illustrates an example use of a size comparison system according to examples described herein.
Figure 1:
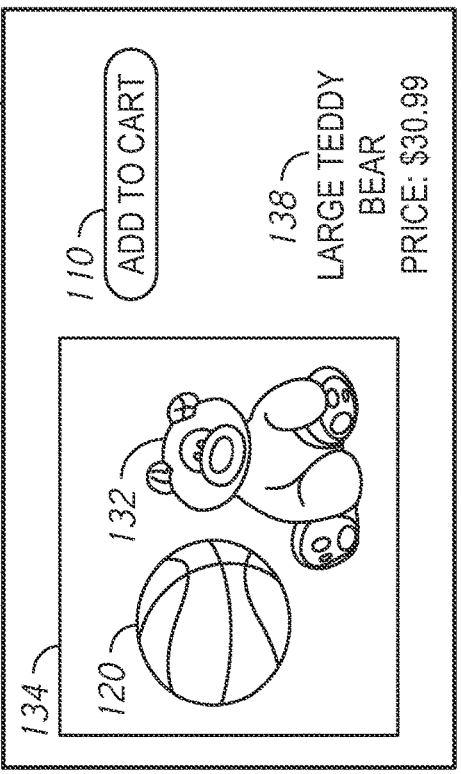
Figure 1:
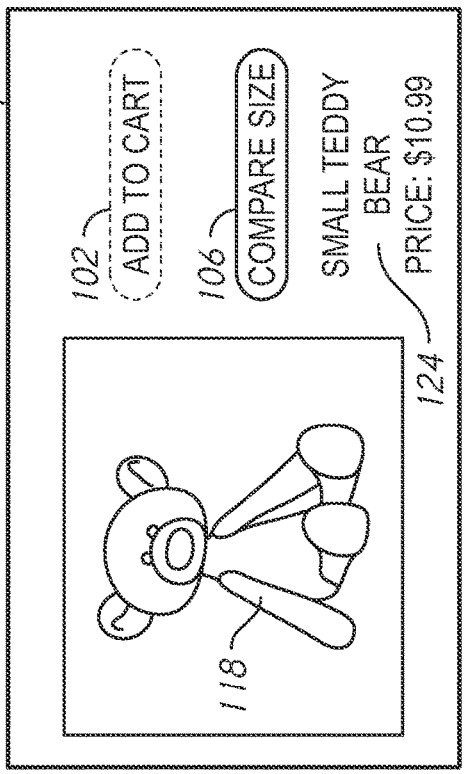
Figure 1:
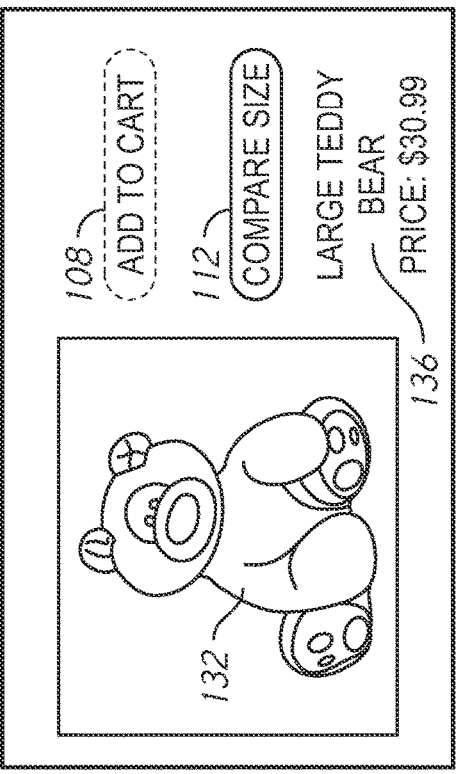

Certain details are set forth herein to provide an understanding of described embodiments of technology. However, other examples may be practiced without various of these particular details. In some instances, well-known circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

In some examples, a size comparison system may generate a size comparison by determining a size of an item based on extracted size data corresponding to the item. A comparison item is selected and the size comparison is generated between the item and the comparison item based on the size of the item. A visual rendering of the item and the comparison item is generated based on the size comparison and is displayed to a user.

A size comparison system may search for items by determining an item size preference based on analysis of item size information received through user input. A search query is generated including a search parameter and the item size preference. A plurality of items are identified from one or more sources, where the plurality of items match at least the search parameter and the item size preference.

One or more non-transitory computer readable media may be encoded with instructions that, when executed by one or more processors of a computing system, cause the computing system to determine a size of an item based on extracted size data corresponding to the item, select a comparison item, and generate an interactive representation of the item and the comparison item using the size of the item and size data of the comparison item to render the interactive representation.

Physical size of an item is often not apparent when viewing an image of an item, such as when shopping for a particular item online. Incorrect assumptions about the size of items based on pictures may lead to frustration for both the customer and the seller as the customer may eventually end up returning the item, even when dimensions are provided in item listings. Further, customers may struggle to find specific items that fit in a physical space or can be used for the customer's intended purpose. Accordingly, a size comparison system may provide a visual comparison of an item and a comparison item of a known size to help customers visualize the scale of an item before purchase. Such size comparison systems may reduce consumer and seller frustration and lead to an improved online retail experience as well as cost and other resource savings due to reduced rates of returns of wrongly sized items.

Examples of size comparison systems described herein generate size comparisons to help customers and other users visualize the size of an item on the internet. The size comparisons may show the item next to a comparison item for scale. A comparison item may be a common item with a size known to most users (e.g., a coin, regulation sized sports ball, or other common products with standardized sizes) or may be an item chosen by the user for comparison. For example, in some implementations, a user may upload an image of an item for comparison or may choose an item from the internet (e.g., an item listed on the same commerce platform) for comparison. Accordingly, the size comparison systems described herein may be used to provide a general sense of scale as well as to allow customers to see how items will fit together.

Some example size comparison systems may generate interactive representations of either one or both of the item and the comparison item. Some interactive representations may allow the user to manipulate images of the item and/or the comparison item to, for example, view items from different angles, move the items relative to one another (e.g., to visualize how the items may fit together), or actuate moving components of items. In some implementations, interactive representations may include interactive tools. For example, a measuring tool may be provided such that users can measure irregular portions of various items. Various types of interactive representations may be available depending on capabilities of the user computing device. For example, some interactive representations may be presented on a screen or other display of a desktop computer or laptop computer. Where the user device is able to display in three dimensions (e.g., a three dimensional television), such interactive representations may be displayed in three dimensions. Interactive representations may also be displayed using virtual reality/augmented reality (AR/VR) in some examples.

In some implementations, size comparison systems may allow users to search for products based on size. For example, a user may provide some preference regarding item size. The user's preference may be obtained by, for example, direct input of desired dimensions, selection of a range of dimensions from size ranges provided to the user, comparison to other items, and the like. For example, a user looking for a stuffed animal may be presented with a size scale showing common, standard-sized objects that may provide a size reference point. A user may then select to search for a stuffed animal approximately the size of a standard basketball. Other comparisons may utilize other items for sale from the online retailer or another location online. For example, a user may select an entertainment center that the user owns or recently purchased and may search for televisions that will fit in the entertainment center.

Turning now to the figures, FIG. 1 illustrates an example use of a size comparison system according to particular embodiments. A size comparison system may be implemented as a web-browser extension or plug-in, mobile application, feature of an online retailer's user interface or standalone software program, in various implementations. In the example of FIG. 1, the size comparison system is implemented as a feature of an online retailer's user interface to allow customers to generate size comparisons before purchasing items from the retailer.

FIG. 1 depicts two views of a display for two items—an initial listing and an updated listing having a size comparison. FIG. 1 accordingly depicts a user interface 114. The user interface 114 may show an initial listing for item 118, which may include visual rendering. The user interface 114 may include button 102 and button 106. The user interface 114 may include descriptive text 118. In an updated listing, the user interface 116 may show an updated listing for an item 118, having a visual rendering 122 of the item 118 and a visual rendering of a comparison item 120. The updated listing includes button 104 and descriptive text 120. Similarly, a user interface 128 may show an initial listing for item 132, which may include a visual rendering. The user interface 128 may include descriptive text 136. In an updated listing, the user interface 130 may show an updated listing for the item 132, having a visual rendering 134 of the item 132 and a visual rendering of the comparison item 120. The components shown in FIG. 1 are exemplary only. Additional, fewer, and/or different components may be used in other examples.

A user interface 114 shows an initial listing for an item 118, which is shown as a small teddy bear. Examples of user interfaces described herein may be implemented, for example, using a display (e.g., liquid crystal display (LCD), light emitting diode display (LED), plasma display, artificial and/or virtual reality display (AR/VR display). A user may interact with a user interface described herein by viewing the interface, and by providing input through one or more input devices such as, but not limited to, one or more touchscreens, keyboards, mice, AR/VR devices, or stylus devices. Examples of items which may be visually represented in accordance with examples described herein generally may include any item that a user may be interested in viewing, inspecting, purchasing, and/or learning about. Examples of items include products, clothing, cars, sporting equipment, furniture, medical devices, home goods, or vehicles. Other items may be used in other examples.

When the image of the item 118 only includes the item (e.g., the small teddy bear), it may be difficult for a customer to visualize how large the toy bear is. For example, small may be used as a descriptor for toy bears of a variety of sizes. Where a user is, for example, searching for a teddy bear that will fit already existing accessories, for example, the descriptor "small" may not be useful. Even actual dimensions may not be useful to the average user, who may be unable to visualize the actual size of, for example, an 8 inch bear. Accordingly, the user interface 114 may provide a button 106 which, when selected by the user, may generate a size comparison between the item 118 and a comparison item 120 to help the user visualize the actual size of the item 118. While described and shown as a button in FIG. 1, generally any of a variety of user interface elements may be used, including a button, a link, an active tile, a gaze input, or an audio input.

In various implementations, the user may be presented with preselected options from which to select a comparison item. Such preselected options may be, for example, standard sized items with dimensions that are known or predefined by the size comparison system. For example, the user interface 116 shows that the user has chosen a basketball as the comparison item 120, and the comparison item 120 and the item 118 are shown in a visual rendering 122 to help the user better visualize the actual size of the car. When viewed next to a comparison item rather than in isolation, the size of an item 118 may be more easily visualized, such that the user can make a more informed decision regarding whether to purchase the item 118. As shown in user interface 116, the visual rendering 122 may be displayed with the original listing for the item 118, such that the user may add the item 118 to an online shopping cart or otherwise purchase the item 118 without navigating to another page.

Further, size comparisons may assist users in visualizing and conceptualizing size differences between similar items. For example user interface 128 shows an item 132, which is a large teddy bear. When viewing the large teddy bear of user interface 128 and the small teddy bear of user interface 114, the size difference between the item 118 and the item 132 may be difficult to conceptualize. The button 112 of the user interface 128 may allow the user to view the large teddy bear with a common comparison item 120, such that the user may more easily conceptualize a size difference between the item 118 and the item 132. For example, the visual rendering 134 of the user interface 130 shows the item 132 and the comparison item 120. When deciding between the item 132 and the item 118, the visual rendering 122 and the visual rendering 134 may assist the user in determining relative size of the items.

Generally, then, in the example of FIG. 1, the comparison item may be a visual rendering of an item having a known size to the user (e.g., a known height, width, length, and/or volume). Any of a variety of items may be used as a comparison item including, but not limited to, sporting goods, vehicles, clothing, furniture, body parts (e.g., a hand, thumb), and money (e.g., a coin).

Other implementations of the size comparison system may allow for custom selection of comparison items, generation of interactive representations, generation of visual renderings of more than two items, searching for items based on a user item size preference, and other features, examples of which are described herein.

Figure 2:
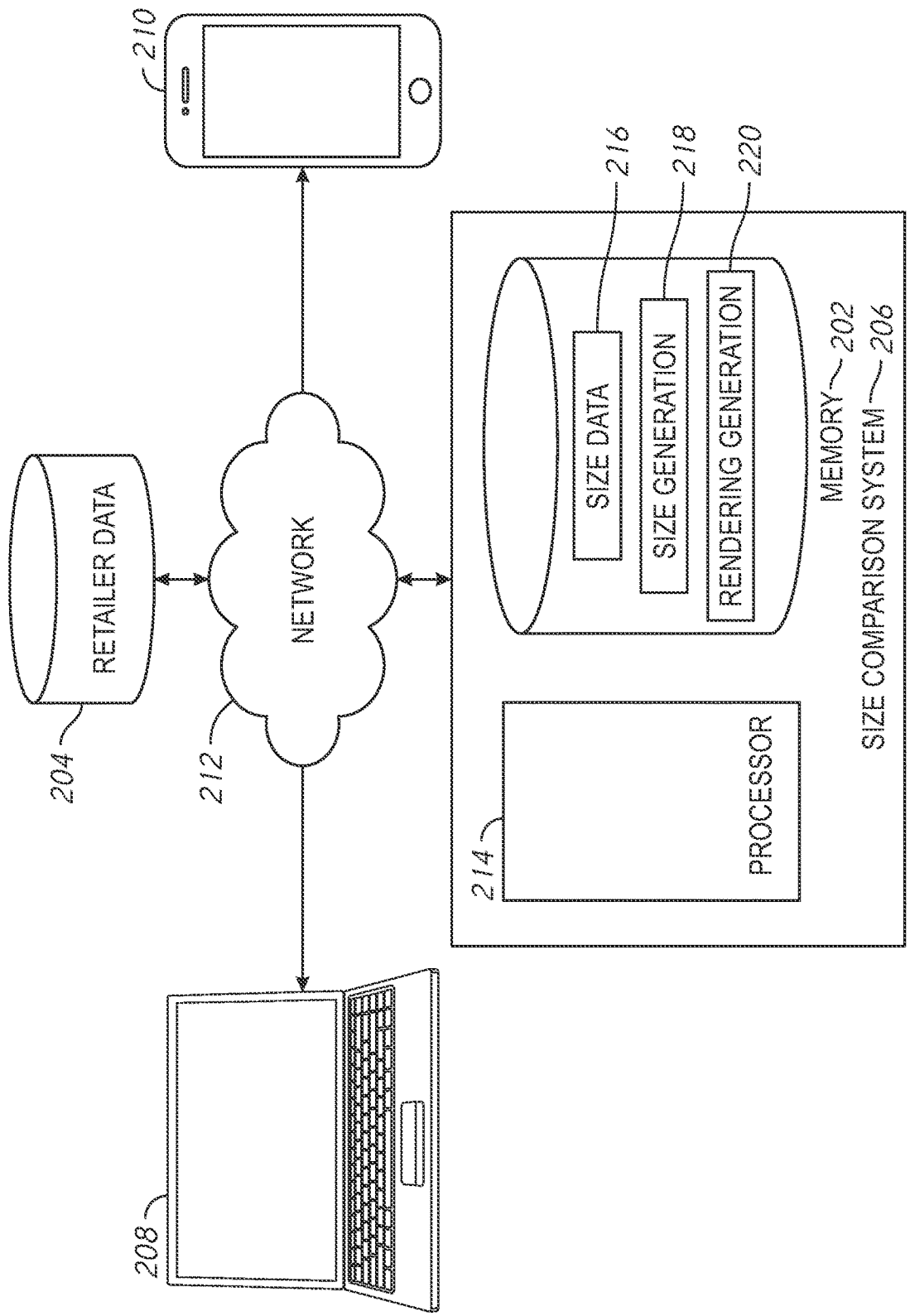
FIG. 2 illustrates an example size comparison system in accordance with examples described herein.

FIG. 2 illustrates an example size comparison system in accordance with one embodiment. A size comparison system 206 may be implemented as a plug-in or web browser. In other implementations, a size comparison system 206 may be implemented as a mobile application, standalone website, downloadable software, or standalone software program. The size comparison system 206 may communicate with user devices 208 and 210 to generate visual renderings of items to assist a user in contextualizing the physical size of the items. The size comparison system 206 may be used to implement, and/or may be partially implemented by the displays shown in FIG. 1 in some examples.

In various implementations, user devices may be implemented using any number of computing devices including, but not limited to, a computer, a laptop, tablet, mobile phone, smart phone, wearable device (e.g., AR/VR headset, smart watch, smart glasses, or the like), smart speaker, vehicle (e.g., automobile), or appliance. Generally, the user device 208 and the user device 210 may each include one or more processors, such as a central processing unit (CPU) and/or graphics processing unit (GPU). The user devices may generally perform operations by executing executable instructions (e.g., software) using the processor(s).

The network 212 may be implemented using one or more of various systems and protocols for communications between computing devices. In various embodiments, the network 212 or various portions of the network 212 may be implemented using the Internet, a local area network (LAN), a wide area network (WAN), and/or other networks. In addition to traditional data networking protocols, in some embodiments, data may be communicated according to protocols and/or standards including near field communication (NFC), Bluetooth, cellular connections, and the like.

Examples described herein may include storage devices, such as one or more databases storing retailer data 204. Such storage devices may be databases, servers, or other repositories of data accessible via the Internet or other network 212. Retailer data 204 may be stored across more than one physical device and may, in some implementations, include storage components and devices belonging to multiple entities, retailers, or other third parties.

Retailer data 204 may include various information about items for sale by a retailer, registered users associated with the retailer, listings for items available from a retailer, and other types of data. For example, retailer data 204 may include identifying information for various items available through the retailer such as brand, model name, model number, product code, stock keeping unit (SKU), international standard book number (ISBN), or other identifiers as appropriate for different categories of product. Other retailer data 204 relating to items may include basic measurements or dimensions for an item. For example dimensional information for length, width, and height of an item may be stored with retailer data 204. Data from the retailer's listings may include, for example, written descriptions of products, photographs of products, compatibility with other items or products, customer reviews (including, in some cases, uploaded customer images), answers to specific questions about products, price. In some implementations, the retailer data 204 may store listings as discrete objects, which may then be accessed and parsed by the size comparison system 206.

In various implementations, retailer data 204 may include data about customers or users of the retailer. For example, retailer data 204 may include user profiles for registered users which may include purchase history, return history, review history, uploaded images, and other information corresponding to each of the registered users of the retailer. In some implementations, a user may access their own user profile for use by the size comparison system 206. For example, a user may access purchase history from a user profile stored as retailer data 204 and select a previously purchased item for use as a comparison item. User data may also be stored or used as anonymized or aggregated user data. For example, items purchased by other users with similar purchase history may be recommended to the user. In one example, a user who has purchased a bike may be presented with bike accessories purchased by other users who have also purchased the bike, as such accessories are likely to fit the bike.

In various implementations, the size comparison system 206 may include or utilize one or more hosts or combinations of compute resources, which may be located, for example, at one or more servers. Generally, the size comparison system 206 is implemented by compute resources including hardware for memory 202 and processor 214. For example, the size comparison system 206 may utilize or include one or more processors, such as a CPU, GPU, and/or programmable or configurable logic. Memory 202 may include volatile and nonvolatile memory configured to store computer readable data and instructions to implement various embodiments of the size comparison system 206 described herein. For example, memory 202 stores computer readable size data 216 and executable instructions to implement size generation 218 and rendering generation 220. Various components of the size comparison system 206 may communicate through wired or wireless connections.

The memory 202 of the size comparison system 206 may hold instructions for various functions of the size comparison system 206 which, when executed by processor 214, perform various functions of the size comparison system 206. The memory 202 may also store various data used by the size comparison system 206, such as size data 216. For example, the memory 202 may include instructions for size generation 218 and rendering generation 220 as well as size data 216 which may be accessed during execution of the instructions for size generation 218 and/or rendering generation 220.

Size data 216 may include various raw or formatted data including information usable to determine the size of an object or item. For example, size data 216 may include basic measurements of the item including, for various items, length, width, height, diameter, circumference, diagonal measurement, etc. Size data 216 may also include measurements of particular portions of an item or compatibility between particular components of an item and a standardized component. For example, a computer monitor may include universal serial bus (USB) ports, which have a standard size. Accordingly, size data 216 for the monitor may include the size of the USB port and/or other standardized connections and location of such ports relative to other portions of the monitor. Similarly, size data 216 may include a list of products advertised as compatible with an item, where such compatibility is dependent on size. For example, a lighting fixture may advertise compatibility with a specific standardized type of lightbulb. The dimensions of the lightbulb may be size data 216 for the lighting fixture, as they may provide dimensions for the sockets of the lighting fixture.

In some implementations, size data 216 may include an image or multiple images or other types of renderings of an item. For example, size data 216 may include an image of an item including some scale. For example, size data 216 may be an image of an item with an image of a ruler or other measuring device in the image to provide scale. Such images may be extracted from a listing of an item by, for example, searching for images from customer reviews including a measurement scale (e.g., a ruler). Some size data 216 may also include an image of an item with embedded scale information or measurements. For example, some user devices may obtain size information when capturing images. For example, some mobile devices may use AR/VR technology to measure objects within a field of view of the camera. Such information may, in some implementations, be saved with an image of the measured object for use as size data 216.

In various implementations, memory 202 may store executable instructions which, when executed by processor 214 of the size comparison system 206, cause the size comparison system 206 to locate and extract size data 216. In some implementations, these instructions may cause the size comparison system 206 to communicate with retailer data 204 to locate size data 216 for an item stored at the retailer data 204. In some implementations, the instructions may cause the system to communicate with and/or access retailer data 204 to obtain other information about an item, such as one or more listings for the item from various online retailers, specifications of the item from a manufacturer, or similar sources of information. The instructions may include instructions to extract size data 216 from the information retrieved from the retailer data 204. For example, a machine learning model may be used to provide size data based on the retailer data. In some examples, the instructions may include instructions for recognizing size data in the retailer data (e.g., words or other formats indicative of size data). In various implementations, the instructions may also communicate with user devices (e.g., user devices 208 and 210) to obtain size data 216 and/or information from which size data can be extracted for an item or comparison item.

In various implementations, instructions for extracting size data 216 may include one or more natural language processors (NLPs), computer vision models (e.g., object recognition, pattern recognition, pose estimation). For example, instructions for extracting size data 216 may include an NLP configured to search textual description of an object for rudimentary measurements. Other NLPs may search similar textual descriptions for mentions of compatibility with standard-sized items. The textual descriptions searched may include, for example, a retailer's description of an item, listed specifications of the item, and/or posted user reviews of an item. Instructions for extracting size data 216 may also include one or more computer vision algorithms or models for detecting, for example, images of an item including a measurement scale. For example, an object identification model implemented by one or more classifiers and/or a convolutional neural network (CNN) may search for images of an item including, for example, a ruler or measuring tape. Similarly, image understanding systems (IUS) may be used to search for images including some form of scale. Various images associated with an item (e.g., images taken from user reviews of an item) may be presented to a computer vision model, which may return an image or images with a high probability of including a measurement scale. In various implementations, other instructions may extract size data 216.

Size generation 218 may be implemented, in various embodiments, by computer readable instructions stored on memory 202 of the size comparison system 206 and executed by processor 214 of the size comparison system 206. Such instructions may include various instructions to convert size data 216 to size of an object. In various implementations, size generation 218 may generate robust measurements of an item. Size generation 218 may include various sets of instructions for processing different types of size data 216. For example, size generation 218 may include a computer vision model or algorithm configured to accept some measurements of an item (e.g., numerical measurements extracted from textual description or specifications of an item), map the measurements to one or more images of the item, and use the measurements to generate measurements for other portions of the item. Additional computer vision models or algorithms may be included to extract numerical measurements for an item from other information about the item before such measurements are mapped to one or more images of an item. For example, a pattern recognition model may locate a scale (e.g., a ruler or measuring tape) in an image of the item and use the scale to determine at least one measurement of the item. In another example, an image classification model may be used to locate a standardized component on an item (e.g., a USB port) and to map the measurements associated with the standardized component onto the image of the item.

In some implementations, where an interactive representation of the item is not generated or desired, size generation 218 may map measurements used to scale an item relative to another item (e.g., a comparison item). For example, where a comparison item has a fixed height, instructions for size generation 218 may determine a height of the item from size data 216 instead of generating robust or detailed measurements for the item. In these implementations, for example, size generation 218 may include a IUS configured to process or analyze an image of the item until a height dimension is found.

In some implementations, where interactive representations are desired or generated by the rendering generation 220, various models may determine measurements for a variety of possible dimensions of the item. For example, where an item is a coffee table and the user or system selects an interactive representation of the coffee table, size generation 218 may generate, in addition to the width, length, and height of the coffee table, measurements for distances between legs of the coffee table, dimensions of each of the legs of the coffee table, thickness of the top of the table, etc. Such measurements may allow a user to visualize how the coffee table fits with or next to other items. For example, where a comparison item is a table cloth, the user may be able to move the table cloth relative to the coffee table to see if, given the thickness of the top of the table, the table cloth completely covers edges of the coffee table when placed on top of the coffee table. Further, the interactive representation may, in some implementations, allow the user to measure various portions of the coffee table. For example, the user may measure the bottom edges of the legs of the coffee table to determine whether a specific type of anti-slip cover fits over the legs of the coffee table.

Various instructions for size generation 218 may be used to obtain measurements for an item. For example, a computer vision model may include multiple discrete models to perform different portions of the size generation process. In some implementations, the computer vision model may process multiple images of the same item to generate detailed measurements of the item. An image segmentation model and/or a feature extraction model may extract edges of the item in the image. For example, the image segmentation model may extract the item from the image and the feature extraction model may extract the edges of the item from an image of the item generated by the image segmentation model. Alternatively or in addition, the feature extraction model may extract all edges of the image and the image segmentation model may determine which edges belong to the object. A size estimation model may use the extracted edges and known measurements to determine the length of the extracted edges and generate an estimation of size of the object. The size estimation model may, in various implementations, include pose estimation. Where the computer vision model analyzes multiple images of an item, the computer vision model may include an image registration model to combine information generated from each of the various analyzed images.

Rendering generation 220 may be implemented, in various embodiments, by computer readable instructions stored at memory 202 of the size comparison system 206 which, when executed by processor 214 of the size comparison system 206, cause the size comparison system 206 to generate visual renderings including an item based on size of the item and a comparison item. In some implementations, such visual renderings may be static renderings including both the item and the comparison item, such that the item and the comparison item are fixed relative to each other and pose of the item and comparison item are fixed. In other implementations, visual renderings may be dynamic such that one or more of pose, position, or orientation of the item or the comparison item may be updated. In some implementations, the user may interact with a dynamic representation to change attributes of the item and/or the comparison item. In other implementations, attributes of the item and/or the comparison item may be updated by the size comparison system 206. For example, the item may rotate (e.g., the pose of the item may change) at a predetermined rate when a user is viewing the visual rendering.

In some implementations, the visual rendering may include a rendering of the item which may be presented using AR/VR relative to a physical comparison item. For example, where the user device 210 has AR/VR capability, the user may select an item to render relative to a physical space captured by the user device 210. In a particular example, a user may capture a room using the user device 210 and may obtain a visual rendering of the item that may be presented within the room using AR/VR capabilities of the user device 210. In such implementations, rendering generation 220 may communicate data and information to the user device 210, which the user device 210 may use to generate and/or display the rendering to the user.

In some implementations, rendering generation 220 may generate interactive representations of the item, such that the user may manipulate the visual rendering to obtain additional information about the item. For example, the user may, in various implementations, re-orient the item and/or the comparison item, change positioning of the item and/or the comparison item, interact with actuatable components of the item and/or the comparison item (e.g., open a cabinet door or drawer, pull down a murphy bed, place a leaf into a table, open and close a laptop, etc.), and/or use tools to obtain additional information about the item (e.g., use a built in measuring tool to obtain specific measurements of the item).

The computer readable instructions implementing rendering generation 220 may communicate with a user device (e.g., user device 208 or user device 210) via a network 212 to display the visual rendering using a display associated with the user device 208 or the user device 210. In some implementations, where the size comparison system 206 is implemented, for example, as a plug-in for a commerce website, the instructions implementing rendering generation 220 may communicate with one or more servers of the commerce website to display the visual rendering to the user instead of or in addition to images of the item displayed to the user by the commerce website. For example, as described with respect to FIG. 1, the user interface 116 may display the visual rendering 122 in place of the original image of the item 118 within the original listing.

Figure 3:
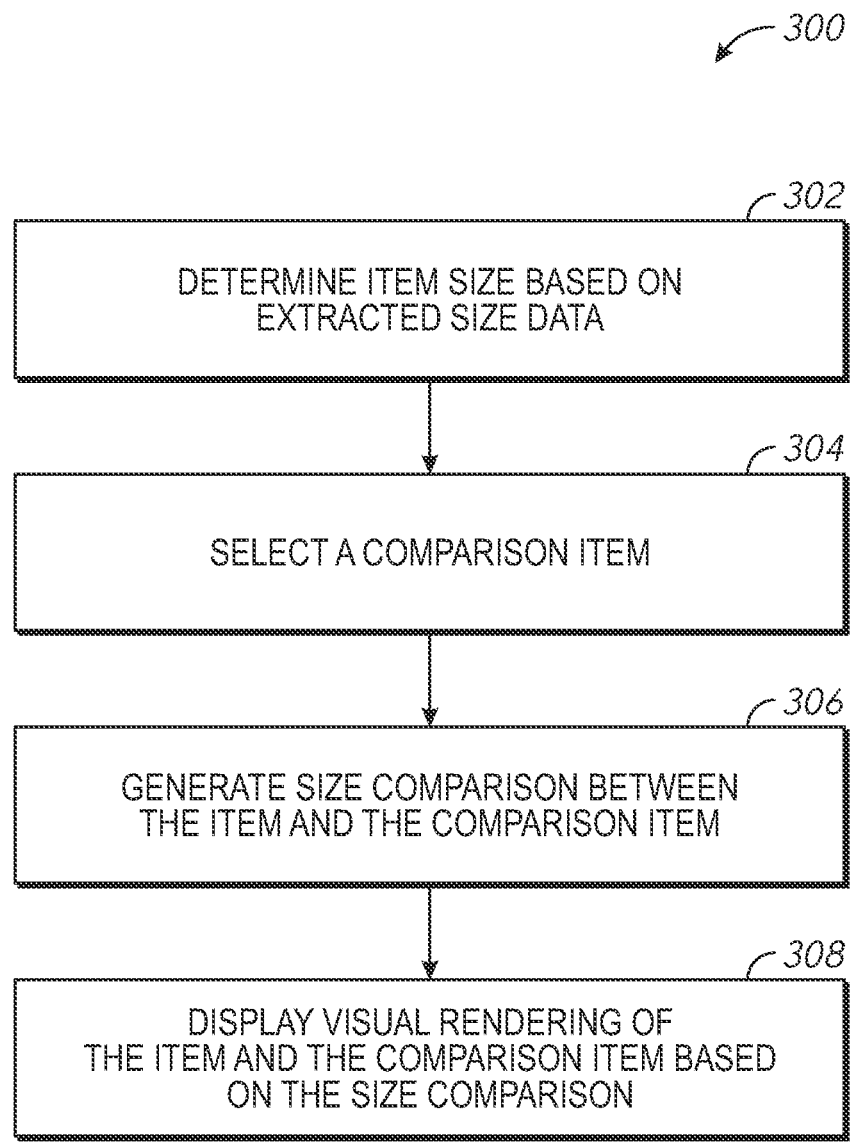
FIG. 3 illustrates a routine in accordance with examples described herein.

FIG. 3 illustrates operations 300 for use of the size comparison system 206 to generate a visual rendering of an item for size comparison to a comparison item in various implementations. The operations 300 may be performed by various components of the size comparison system 206 and/or by user devices (e.g., user devices 208 and 210) in various embodiments. In block 302, item size is determined based on extracted size data 216. For example, the size comparison system 206 may pull text information from the item listing, searching for keywords such as "dimension," "width," "length," and the like. The size comparison system 206 may also grab other item information from the item listing, such as a seller image or customer review image with rulers or measurements shown in the image.

In various implementations, size data 216 may be extracted from a commerce listing or other webpage describing an item, a stored description and/or image of an item, user input, which may include images, text input, or other types of input, and/or from retailer data 204 or other remote storage location storing size data 216 for an item. For example, in some implementations, a commerce platform may ask sellers to provide rudimentary dimensions for items listed for sale on the commerce platform and extracting size data 216 may access dimensions provided by the seller by reading dimensions from a description of the item provided in the listing, accessing dimensions provided by the seller from a database or other storage location (e.g., retailer data 204), or reading dimensions from the fields provided to the seller for input.

In various implementations, the size comparison system 206 may parse and analyze one or more listings for an item to locate size data 216. For example, an NLP may process text presented with the item to find dimensions of the item and/or a computer vision model or object classifier may search images of the item associated with a listing, including listing photos provided by the seller and/or photos posted with customer reviews for images including some type of scale (e.g., a ruler, tape measure, or standard sized object for scale). In some examples, a computer vision model or object classifier may also search images of the item for standardized components of a known size such as, for example, ports for standardized connectors, standardized hardware, and the like. Accordingly, the size comparison system 206 may impose a scale on an image of an object using components of a known size. For example, a micro USB port located on a smart phone may provide measurements for at least the micro USB port, providing a scale for the image and enabling item size determination.

In various implementations, the size comparison system 206 may search the internet, databases, or other locations to locate additional size data 216 about the item. In one example, the size comparison system 206 may first analyze a commerce listing being viewed by the user and, where no satisfactory size data 216 can be extracted from the listing, the size comparison system 206 may use other information extracted from the listing to search for additional size data 216. For example, where a commerce listing does not include dimensions or images including scale objects, the size comparison system 206 may search the internet using a SKU, model number, product name, or image of the item to locate additional information about the item. For example, listings for the item on other commerce platforms, manufacturer information, and/or articles about the item may include size data 216. Such functionality may be useful especially where the initial commerce platform is a second-hand platform where sellers may not post detailed information about item dimensions.

In some implementations, the size comparison system 206 may extract multiple types of size data 216 from the original commerce listing and/or additional locations. The size comparison system 206 may keep all of the extracted size data 216 to use in determining the item size. In other examples, the size comparison system 206 may choose some of the extracted size data 216 based on reliability of the source of the size data 216, robustness of the size data 216 (e.g., size data 216 including more dimensions may be chosen over size data 216 including only length), or other factors. In some examples, the size comparison system 206 may remove duplicate or conflicting size data 216 while keeping as much size data 216 as practicable.

After the size data 216 for the item is extracted, instructions for size generation 218 may be executed by processor 214 of the size comparison system 206 to determine a size of the item. In various implementations, the size of the item may include determination of measurements in two dimensions, determination of measurements in three dimensions, dimensions of all components of an item, range of movable components of the item, or other subsets of dimensions. For example, where the visual rendering of the item relative to the comparison item is static and includes two dimensional images of the item and the comparison item, a determined size of the item may include one dimension of the item (e.g., height) and may include ratios of other dimensions of the item. In contrast, where the visual rendering of the item relative to the comparison item is dynamic and/or interactive, determining the size of an item may include determining dimensions of all detected edges of an item. Accordingly, size generation 218 may include different instructions which execute based on parameters associated with the visual rendering ultimately being produced by the size comparison system 206. Such differentiation may improve processing time and save processing resources by using less processing to generate static visual renderings.

The size comparison system 206 may generate a size for an object using instructions that may vary depending on the size data 216 available and the target visual rendering. In some implementations, size data 216 may be used in combination with, for example, images of the item to generate a size of the item. In one example, to generate a size of an item for a static, two-dimensional visual rendering, the size comparison system 206 may use dimensions provided as size data 216 and map the dimensions onto an image of the item. In other examples, instructions may analyze one or more images, video, or other visual representations of an item, along with size data 216 corresponding to the item to determine a size of the item including detailed measurements. For example, the size comparison system 206 may use a pattern recognition model to locate a scale object (e.g., a ruler, tape measure, scale, or standardized item or component) in an image of the item. Where the scale object is a standardized component, the size comparison system 206 may access, from its own memory 202 or from a remote storage location, dimensions of the scale object. The dimensions of the scale object may then be used to determine other dimensions of the item by providing a scale for at least one image of the item. Similarly, where the scale object is a measuring object, such as a ruler or tape measure, the size comparison system 206 may use pattern recognition and/or other image processing to determine the scale of the measuring object to obtain dimensions, again providing a scale for at least one image of the item.

In various embodiments, the size comparison system 206 may use a computer vision model, which may include instructions to determine size of an item using a scale obtained from a scale object. For example, an image segmentation model and feature extraction model may extract edges of the item from one or more images, video, or representations of the item. A size estimation model may then use the scale provided by the scale objects to determine dimensions of the extracted edges of the item. In some implementations, the size comparison system 206 may analyze multiple images of the item to obtain dimensions of components not visible in a single image. In such implementations, an image registration model may combine edge measurements obtained from the multiple images to generate a fully dimensioned model of the item. Other models and techniques, such as pose estimation, may also be used to combine multiple images of an item or to analyze images of the item.

In some implementations, size data 216 may include a video of the item. For example, the item itself may be movable (e.g., a toy car), a portion of the item may be movable (e.g., a height adjustable desk), or a video may move around the item to show different angles. In such examples, the size comparison system 206 may use deep neural networks or other models or algorithms to observe how the item moves relative to reference objects in the video to determine the size of the item.

In block 304, a comparison item is selected. Comparison items may be various physical items including, for example, consumer products, building features (e.g, windows, doors, rooms, etc.), vehicles, topographical features, people, and the like. Comparison items may be selected in a variety of ways in various implementations by a user or by the size comparison system 206. For example, a comparison item may be selected by a user from a list of items available for size comparison. A comparison item may also, in some implementations, be an item uploaded by a user, selected by a user through a commerce listing, or otherwise uploaded or imported by the user. In some implementations, a comparison item may be selected automatically by the size comparison system 206 from a list or database of known size items based on the item size.

For example, a buyer may take a photo of a nearby item as a reference for comparison or may use a standard item provided by the size comparison system 206 for comparison. Once a photo is taken an uploaded to the size comparison system 206, the photo may be saved to a user profile as a reference item and may be used in additional comparisons by the buyer.

In examples where the user selects a comparison item, the user may select an item from a list of comparison items presented to the user. For example, the user may be presented with a variety of known-size or standard size items such as, for example, coins, paper money, regulation sized sporting equipment, standardized paper products (e.g., a sheet of printer paper), writing implements, etc. The user may then select a comparison item with which the user is the most familiar or a comparison item that emphasizes a dimension of interest to the user. For example, some users may be less familiar with the size of regulation sized sporting equipment and would prefer to compare an item to a sheet of standard sized printer paper. Additionally, where a user is most concerned about a height of an item, the user may choose to use a hockey stick as a comparison item rather than a basketball.

In various implementations, a comparison item may be selected by the user from a collection or list of items previously purchased by the user or from a list or collection of other items available from a commerce site. For example, the user may select an item already in the user's cart or otherwise marked by the user (e.g., as a saved item). Accordingly, a user may compare the size of two (or more)

items before purchasing the items. Such comparison may be helpful when a user is purchasing complementary items, such as, for example, chairs and cushions to fit on the chairs, patio furniture and covers for the furniture, a laptop and briefcase for the laptop, etc. Similarly, the user may select a comparison item from the user's purchase history, which may, in some implementations, be stored at retailer data 204. Accordingly, a user may compare the size of an item the user is contemplating purchasing to an item the user already owns. Such comparisons may be useful for complementary items but may also be used for non-complementary items to give the user a sense of scale. For example, a user may compare a stuffed animal to a recently purchased bottle of shampoo to get a better sense of the size of the stuffed animal in terms of an item of a known size.

A comparison item may also be provided by the user through various means. For example, where a user device 210 includes functionality for AR/VR, the user may use such functionality to capture an environment including a comparison item. In some implementations, user device 210 may capture measurements of the comparison item, either automatically, or by prompting the user to place anchor points or other reference points on an image of the comparison item to generate measurements. In other implementations, a user may capture an image of a comparison item and may provide measurements of the comparison item or otherwise provide size data 216 for the comparison item. For example, the user may upload an image of a comparison item and input known dimensions of the item. The user may also upload an image of the comparison item including a scale or measurement (e.g., uploading an image of the comparison item next to a ruler). In either implementation, the size comparison system 206 may extract or receive size data 216 for a comparison item and generate a size of the comparison item using size generation 218 instructions of the size comparison system 206. Accordingly, the size comparison system 206 may be utilized to compare items whose size is not previously known by the size comparison system 206.

In some implementations, a user may further provide a comparison item by providing a link (e.g., a URL) to a commerce listing for an item the user is selecting as the comparison item or to another website including information about the item the user is selecting as the comparison item (e.g., an article reviewing the item, a manufacturer website, etc.). Such links may be associated with an online commerce platform in use by the user or may be associated with other online retailers or unrelated websites. In some implementations, the size comparison system 206 may provide a search interface to allow a user to search for an appropriate website describing an object the user wishes to use as a comparison item. The search interface may search using, for example, SKU, model name, model number, brand name, year of release, or other item identifiers. Accordingly, a user may search for an online listing for an item when the user does not know where to locate the item online. For example, a user may purchase a chair from a physical retail store and may wish to use the chair as a comparison item to visualize the size of a pillow on an online commerce platform relative to the chair. The user may search the brand name of the chair to locate a listing for the chair so that the size comparison system 206 has information to use the chair as a comparison item.

In various implementations, the size comparison system 206 may automatically select a comparison item from a subset of standard sized items. In some implementations, a user may revise the system's choice of comparison item by choosing an alternate comparison item. The size comparison system 206 may, in some implementations, choose the comparison item based on the size of the item. For example, certain comparison items may be used for items whose dimensions fall within a defined range. In one example, items having no dimensions larger than 30 mm may be automatically rendered with a U.S. Quarter dollar coin as a comparison item. In some implementations, selection of a comparison item by the system may also be dependent on information about the user, such as the user's geographic location or currency of choice. For example, monetary objects may be chosen as comparison items when the objects match the currency settings of the user. In another example, for the same item, an American football may be chosen as a comparison item for a user located in the United States while a rugby ball may be chosen as a comparison item for a user located in New Zealand.

In block 306, a size comparison is generated, comparing the item and the comparison item. Where the size of the comparison item is known (e.g., a standardized comparison item chosen from a list of possible comparison items), the size comparison may include scaling an image of the item relative to the comparison item based on the determined size of the item. For example, the size comparison system 206 may choose an image scale and scale images of the comparison item and/or the item such that the comparison item and the item are shown using the same chosen scale. In some implementations, the size comparison system 206 may also choose placement of the item and the comparison item to provide easy visual comparison for the user. For example, the size comparison system 206 may rotate or otherwise move images of the item and/or the comparison item to display the item and the comparison item on the same or a similar axis. In some examples, the size comparison system 206 may align a portion of the item and the comparison item (e.g., a bottom-most edge of the item) to facilitate comparison of a specific dimension (e.g., height) of the item and the comparison item.

In other implementations, generating a size comparison may include determining a size of the comparison item. For example, where a user chooses a comparison item from the internet or by providing an image or other data about a comparison item, the size comparison system 206 may use the same or similar operations as those described to determine size for the item to determine a size of the comparison item. Once the size of the item and the size of the comparison item are known, the size comparison may be generated. As described elsewhere, in some implementations, the size comparison may be generated by scaling existing images of the item and/or the comparison item. In other implementations, the size comparison may be generated by, for example, generating three-dimensional renderings for the item and/or the comparison item from various images and scaling the three-dimensional renderings relative to one another by imposing a shared scale for the renderings of the item and the comparison item.

A size comparison may also be generated by scaling a rendering of the item for display relative to an existing physical comparison item, such as through use of AR/VR capability on the user device 210. In such implementations, the size comparison system 206 may determine a scale of the comparison item and scale a rendering of the item using the scale. For example, in some implementations, the environment of the user device 210 may be used as a comparison item, such that the field of view of, for example, a camera of the user device 210 is the comparison item. The size comparison system 206 may determine the scale of the field of view of the user device 210 and impose the same scale on the rendering of the item such that the item may be viewed in the field of view of the user device 210 at its correct size.

In some implementations, a size comparison may include a comparison between more than two items. Such size comparisons may be generated using similar methods and techniques as those described above to generate a size comparison for an item and a comparison item. For example, a shared scale may be determined and images of all of the items included in the size comparison may be adjusted (e.g., scaled) to match the shared scale.

In block 308, a visual rendering of the item and the comparison item is displayed. A visual rendering may be generated from the size comparison and may be sent or delivered to a user device for viewing using various displays of the user device. In some implementations, a visual rendering may also be sent to other devices as specified by the user.

Where the size comparison system 206 is implemented as a plug-in for a web browser or as a component of a commerce platform, the visual rendering may be displayed within the listing for the item by serving a user device an updated webpage including the visual rendering. In various implementations, the visual rendering may displayed instead of or in addition to images of the item shown in the original listing. The visual rendering may also be displayed using, for example, a pop-up window or new tab instead of or in addition to display on the original listing page. The visual rendering may also be displayed after directing the user to another website or, in the case of a mobile application or standalone software, may be displayed on its own screen.

A visual rendering may also be displayed using, for example AR/VR functionality of the user device 210. Such technology may allow for display of a rendering of the item next to a physical comparison item. Such implementations may be especially useful for visualizing how furniture or other items fit within a room or other environment.

In various implementations, visual renderings may be interactive representations, such that the user is able to, for example, manipulate one or more of the item and the comparison item or use additional tools to obtain information about the item and/or the comparison item. For example, some interactive representations may allow the user to reposition, rotate, and otherwise manipulate renderings of the item and/or the comparison item. In an example where the item is a chair and the comparison item is a table, the user may reposition the chair to visualize how well the chair fits under the table. Similarly, some implementations may allow the user to place items and/or comparison items in or on one another, such as by placing a book on a shelf, a dish in a cabinet, a centerpiece on a table, etc. Other interactive representations may allow the user to move or actuate portions of the item and/or comparison item, such as opening and closing a laptop, opening a cabinet door, adjusting a piece of adjustable furniture, opening blinds, etc. Such movements may give the user additional information about size and range of motion of the item.

Some interactive representations may include tools for the user to obtain additional information about the item. In various examples, tools may allow the user to measure specific portions of the item, view interior portions of the item, view the item in other available colors, or view additional information about the item such as weight, estimated shipping cost, etc. For example, a measuring tool may allow a user to select two points on the item and calculate a distance between the points. A tool allowing the user to view interior portions of the item may include options for generating a section or cutaway view of the item and/or rendering outer portions of the item in a translucent style, such that the user can see through outer portions.

Visual renderings may be presented with additional tools or links to enable the user to take a variety of actions depending on the user's desired action. For example, some tools may allow the user to duplicate the image or rendering of the item to see how multiple instances of the same item fit in a space. Some examples may include links to other available sizes of the item, and may allow the user to add additional sizes of the item to the current visual rendering for comparison. Additional buttons, links, or options may allow the user to search for related items of a similar size, related items that are smaller, or related items that are larger. For example, where the item is a throw pillow and the user determines, after viewing a visual rendering of the throw pillow relative to a chair the user owns, that the pillow is too large, the user may have the option to search for similar looking pillows that are smaller than the original pillow.

Figure 4:
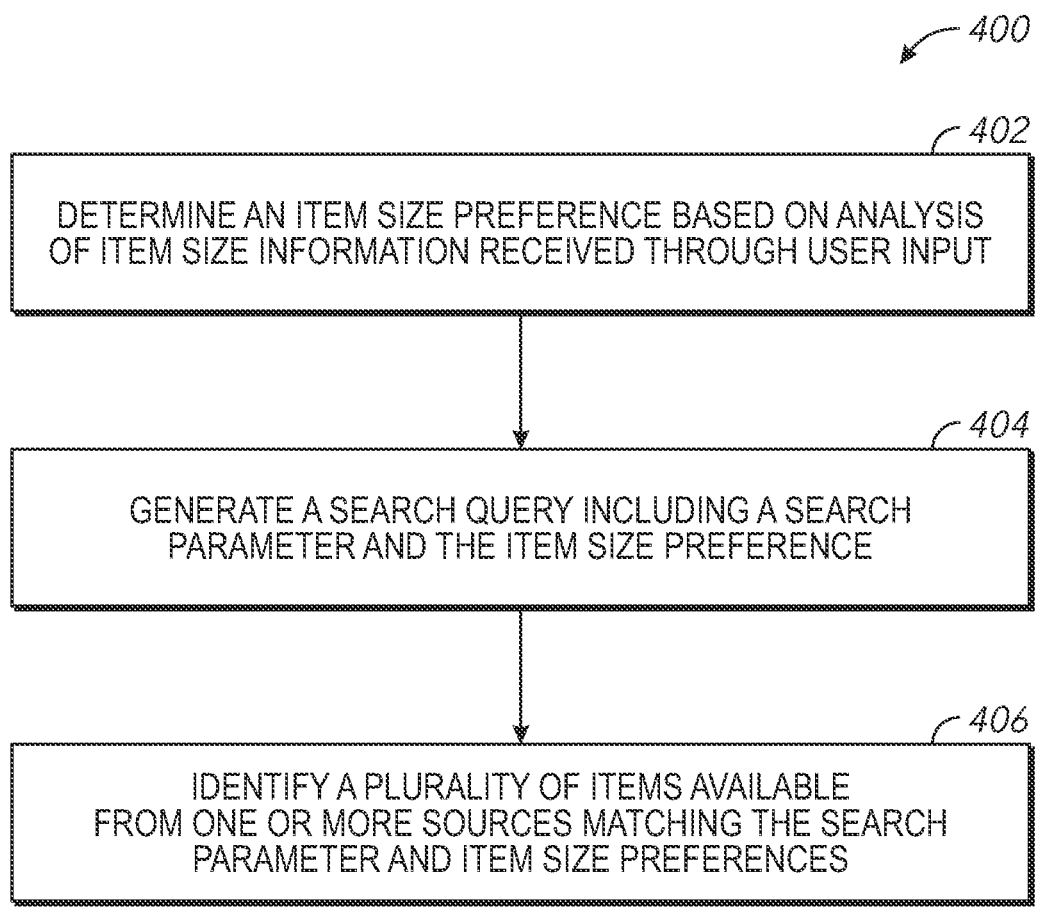
FIG. 4 illustrates a routine in accordance with examples described herein.

FIG. 4 illustrates operations 400 in accordance with one embodiment for use of the size comparison system 206 for searching for items based on size. Searching for items based on size may allow for more efficient and relevant searching on online commerce platforms, leading to an overall smoother customer experience. For example, instead of searching for a "small teddy bear" and receiving results for various sizes of teddy bears, a user may search for a teddy bear that is close to the size of a basketball. Accordingly, users may more easily locate items of interest from online retailers.

The operations 400 may be performed by various components of the size comparison system 206 in various embodiments. In block 402, an item size preference is determined based on analysis of item size information received through user input. Item size information may include, for example, selection of an option by the user to search for an item of a smaller size, similar size, or larger size relative to another item being viewed by the user. Item size information may also be gathered from a user via a survey or scale presented on a user interface of a user device. For example, a user may be presented with a slider bar with various standard sized objects located along an axis of the slider bar. The user may then move a control of the slider bar close to a standardized object of the desired size. On a slider bar with a coin on one end and a car on the other, a user may move the control of the slider bar near a softball, indicating that the user wishes to search for objects roughly the size of a softball.

Item size information may also be provided by providing desired measurements or desired compatible items. For example, a user may look specifically for a bookcase shorter than 3 ft in height. In another example, a user may provide dimensions of a table to search for a tablecloth to fit the table. In other examples, a user may choose a compatible item from a website, a commerce platform, or by uploading an image or other rendering of the compatible item. In such implementations, the size comparison system 206 may use the same or similar methods as those described to determine the size of an item to extract item size information about the compatible item.

Item size preference may be determined based on item size information. In some implementations, item size preference may be a range of dimensions, where the item size information is within the range of the item size preference. In other implementations, the item size preference may be expressed as, for example, a range of dimensions larger or smaller than an item provided with item size information.

Where the item size information is based on a compatible item, item size preference may be determined using both dimensions of the compatible item and assumptions about a relationship between the compatible item and the item the user is searching for. For example, where the user is searching for a serving platter that fits in a cabinet, the item size preference may be to search for a serving platter with a length and width smaller than the length and depth of the cabinet. In another example, where the user is searching for a protective floor covering for use with a piece of exercise equipment, the item size preference may look for protective floor coverings which covering a larger area than the footprint of the piece of exercise equipment. Such assumptions about the relationship between the compatible item and the item to search may be provided by the user, included in computer readable instructions of the size comparison system 206, or suggested by a retailer or commerce platform.

At block 404, a search query is generated including a search parameter and the item size preference. Generally, a search parameter may include keywords provided by the user to search for a particular product or item. In some implementations, the size comparison system 206 and/or a search function of the commerce platform may include or suggest for inclusion additional related words based on keywords provided by the user. Where the user has chosen to search based on an existing object (e.g., by searching for similar or related items), the search parameter may include metadata or keywords that would return the existing object when search. Search parameters may include, for example, categories of items, brand names, model names, specific items, attributes of items such as color or material, and the like. A search query may be generated by combining one or more search parameters with the previously determined item size preference.

At block 406, a plurality of items are identified matching the search parameter and item size preference. In some implementations, the plurality of items may be identified by entering the search query into a search function of a commerce platform, such that items on the commerce platform are returned responsive to the query. In other implementations, the search query may be used with a generalized search engine to return items from multiple commerce sites, retailers, and other websites. The user may select one or more of the returned items and may use the size comparison system 206 to generate a size comparison between multiple returned items or between a returned item and a reference item. Further, the user may, in some situations, be provided with the option to add one or more of the returned items to an existing visual rendering. Such renderings may allow a user to more quickly and accurately locate an item or product that fits the user's needs.

Figure 5:
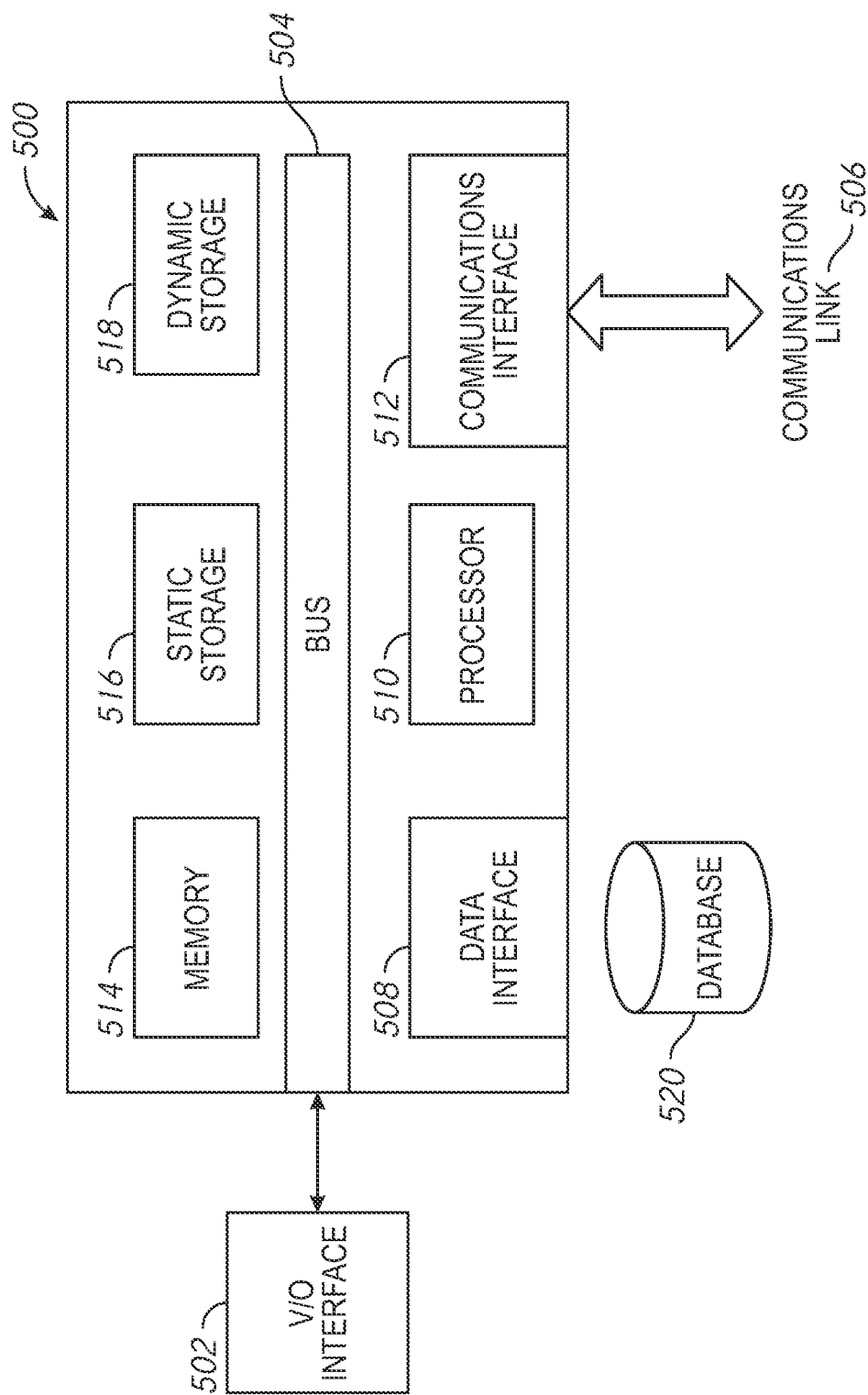
FIG. 5 illustrates a computing system suitable for implementing examples described herein.

FIG. 5 is a block diagram of an illustrative computing system 500 suitable for implementing particular embodiments. For example, user device 208, user device 210, retailer data 204, and/or the size comparison system 206 may be implemented by a computing system, such as computing system 500. In particular embodiments, one or more computing systems 500 perform one or more operations of one or more methods described or illustrated herein. In particular embodiments, one or more computing systems 500 provide functionality described or illustrated herein. In particular embodiments, software running on one or more computing systems 500 performs one or more steps of one or more methods described or illustrated herein or provides functionality described or illustrated herein. Particular embodiments include one or more portions of one or more computing systems 500. Herein, reference to a computing system 500 may encompass a computing device, and vice versa, where appropriate. Moreover, reference to a computing system 500 may encompass one or more computing systems, where appropriate.

This disclosure contemplates any suitable number of computing systems 500. This disclosure contemplates a computing system 500 taking any suitable physical form. As an example and not by way of limitation, computing system 500 may be an embedded computer system, a system-on-chip (SOC), a single-board computer system (SBC) (such as, for example, a computer-on-module (COM) or system-on-module (SOM)), a desktop computer system, a mainframe, a mesh of computing systems, a server, a laptop or notebook computer system, a tablet computer system, or a combination of two or more of these. Where appropriate, computing system 500 may include one or more computing systems 500; be unitary or distributed; span multiple locations; span multiple machines; span multiple data centers; or reside in a cloud, which may include one or more cloud components in one or more networks.

Computing system 500 includes a bus 504 (e.g., an address bus and a data bus) or other communication mechanism for communicating information, which interconnects subsystems and devices, such as processor 510, memory 514 (e.g., RAM), static storage 516 (e.g., ROM), dynamic storage 518 (e.g., magnetic or optical), communications interface 512 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 502 (e.g., keyboard, keypad, mouse, microphone). In particular embodiments, computing system 500 may include one or more of any such components.

In particular embodiments, processor 510 includes hardware for executing instructions, such as those making up a computer program. The processor 510 circuitry includes circuitry for performing various processing functions, such as executing specific software to perform specific calculations or tasks. In particular embodiments, I/O interface 502 includes hardware, software, or both, providing one or more interfaces for communication between computing system 500 and one or more I/O devices. Computing system 500 may include one or more of these I/O devices, where appropriate. One or more of these I/O devices may enable communication between a person and computing system 500.

In particular embodiments, communications interface 512 includes hardware, software, or both providing one or more interfaces for communication (such as, for example, packet-based communication) between computing system 500 and one or more other computer systems or one or more networks. One or more memory buses (which may each include an address bus and a data bus) may couple processor 510 to memory 514. Bus 504 may include one or more memory buses, as described below. In particular embodiments, one or more memory management units (MMUs) reside between processor 510 and memory 514 and facilitate accesses to memory 514 requested by processor 510. In particular embodiments, bus 504 includes hardware, software, or both coupling components of computing system 500 to each other.

According to particular embodiments, computing system 500 performs specific operations by processor 510 executing one or more sequences of one or more instructions contained in memory 514. Such instructions may be read into memory 514 from another computer readable/usable medium, such as static storage 516 or dynamic storage 518. In alternative embodiments, hard-wired circuitry may be used in place of or in combination with software instructions. Thus, particular embodiments are not limited to any specific combination of hardware circuitry and/or software. In one embodiment, the term "logic" shall mean any combination of software or hardware that is used to implement all or part of particular embodiments disclosed herein.

The term "computer readable medium" or "computer usable medium" as used herein refers to any medium that participates in providing instructions to processor 510 for execution. Such a medium may take many forms, including but not limited to, nonvolatile media and volatile media. Non-volatile media includes, for example, optical or magnetic disks, such as static storage 516 or dynamic storage 518. Volatile media includes dynamic memory, such as memory 514.

Computing system 500 may transmit and receive messages, data, and instructions, including program, e.g., application code, through communications link 506 and communications interface 512. Received program code may be executed by processor 510 as it is received, and/or stored in static storage 516 or dynamic storage 518, or other storage for later execution. A database 520 may be used to store data accessible by the computing system 500 by way of data interface 508.

The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Examples described herein may refer to components as "coupled" or signals as being "provided to" or "received from" certain components. It is to be understood that in some examples the components are directly coupled one to another, while in other examples the components are coupled with intervening components disposed between them. Similarly, signals may be provided directly to and/or received directly from the recited components without intervening components, but also may be provided to and/or received from the certain components through intervening components.

What is claimed is:

1. A method of generating a visual rendering of an item and a comparison item, the method comprising:
   analyzing a video including a movement of the item relative to a reference item in the video;
   extracting size data corresponding to the item based on the movement of the item relative to the reference item in the video by extracting edge measurements of the item from multiple images of the item;
   determining a size of the item based on the extracted size data corresponding to the item by combining the edge measurements of the item obtained from the multiple images of the item, wherein the size of the item includes measurements of the item in a number of dimensions, wherein the number of dimensions are selected based on a parameter associated with the visual rendering to generate a fully dimensional model;
   selecting the comparison item;
   generating a size comparison between the item and the comparison item based on the size of the item;
   displaying the visual rendering of the item and the comparison item based on the size comparison, wherein displaying the visual rendering of the item and the comparison item comprises:
   generating a section of the item in a translucent style; and
   scaling an image of the item relative to the comparison item based on the determined size of the item; and
   generating an interactive representation of at least one of the item and the comparison item, wherein the interactive representation comprises allowing a user to actuate moving parts of the at least one of the item and the comparison item based on the size comparison.

2. The method of claim 1, wherein the extracted size data includes an image of the item.

3. The method of claim 2, wherein the extracted size data includes one or more scale objects located in the image of the item.

4. The method of claim 3, wherein one of the one or more scale objects is a standardized component of the item.

5. The method of claim 1, wherein the comparison item is selected from a listing of comparison items based on the size of the item.

6. The method of claim 1, wherein the comparison item is selected based on user input.

7. The method of claim 6, further comprising:
   extracting size data corresponding to the comparison item from an image of the comparison item.

8. The method of claim 7, wherein the size comparison is generated based on the size data corresponding to the item and the size data corresponding to the comparison item.

9. The method of claim 1, wherein the comparison item is a physical item, wherein displaying a visual rendering of the item and the comparison item comprises using augmented reality to display a rendering of the item and the comparison item.

10. The method of claim 1, wherein extracting the size data corresponding to the item comprises utilizing a deep neural network configured to analyze the movement of the item relative to the reference item in the video.

11. The method of claim 1, wherein determining the size of the item based on the extracted size data corresponding to the item comprises searching one or more additional listings for the item at a location separate from a commerce website using the extracted size data.

12. The method of claim 1, wherein the interactive representation further comprises an interactive tool.

13. The method of claim 1, wherein the interactive representation further allows the user to move the at least one of the item and the comparison item relative to the other one of the item and the comparison item.

14. The method of claim 1, wherein displaying the visual rendering of the item and the comparison item further comprises placing the item and the comparison item based on at least one of an axis and a dimension of the item and the comparison item.

15. The method of claim 14, wherein placing the item and the comparison item based on the axis comprises rotating images of the item and the comparison item along the axis.

16. The method of claim 14, wherein placing the item and the comparison item based on the dimension of the item and the comparison item comprises aligning a portion of the item and the comparison item according to the dimension.

* * * * *